US011230951B2

(12) United States Patent
Schwoerer et al.

(10) Patent No.: US 11,230,951 B2
(45) Date of Patent: Jan. 25, 2022

(54) LOST MOTION VARIABLE VALVE ACTUATION SYSTEMS AND METHODS

(71) Applicant: Jacobs Vehicle Systems, Inc., Bloomfield, CT (US)

(72) Inventors: John A. Schwoerer, Storrs Mansfield, CT (US); G. Michael Gron, Jr., Granby, CT (US); Jacob M. Moore, Cromwell, CT (US); Thomas P. Howell, Ann Arbor, MI (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 0 days.

(21) Appl. No.: 16/566,832

(22) Filed: Sep. 10, 2019

(65) Prior Publication Data
US 2020/0080450 A1 Mar. 12, 2020

Related U.S. Application Data

(60) Provisional application No. 62/729,214, filed on Sep. 10, 2018.

(51) Int. Cl.
*F01L 9/14* (2021.01)
*F01L 13/00* (2006.01)
(Continued)

(52) U.S. Cl.
CPC ......... *F01L 13/0015* (2013.01); *F01L 1/3442* (2013.01); *F01L 9/12* (2021.01); *F01L 9/14* (2021.01)

(58) Field of Classification Search
CPC ....... F01L 13/06; F01L 1/181; F01L 2105/00; F01L 9/02; F01L 2001/34446;
(Continued)

(56) References Cited

U.S. PATENT DOCUMENTS 4,656,976 A * 4/1987 Rhoads ............... F01L 13/0031
123/90.12
5,645,031 A * 7/1997 Meneely ............... F01L 13/065
123/321
(Continued)

FOREIGN PATENT DOCUMENTS

| JP | 121907/1980 U | 8/1980 |
| JP | 99903/1982 U | 6/1982 |
| JP | 2015534005 A1 | 11/2015 |

OTHER PUBLICATIONS

International Search Report for International Application No. PCT/US2019/050485 dated Dec. 10, 2019, 3 pages.
(Continued)

*Primary Examiner* — Patrick Hamo
*Assistant Examiner* — Wesley G Harris
(74) *Attorney, Agent, or Firm* — Moreno IP Law LLC

(57) ABSTRACT

A compact, modular, lost motion variable valve actuation assembly includes a dry start hydraulic circuit to enable quick priming of a lost motion master-slave circuit from a dry start reservoir to the master piston chamber during engine start. Motion of the master piston on engine startup may draw in fluid from the dry start hydraulic circuit. The dry start components may be integrated into a compact modular rocker shaft pedestal package suitable for retrofit on existing engine head assemblies. The master piston may include a push tube interface that includes a deep push tube cavity and lubrication capabilities in the master piston that provides for improved wear, stability, easy installation and alignment. The slave piston may be provided with a valve catch to reduce valve closing velocity during cycles involving lost-motion.

32 Claims, 13 Drawing Sheets

(51) Int. Cl.
*F01L 1/344* (2006.01)
*F01L 9/12* (2021.01)

(58) Field of Classification Search
CPC . F01L 9/021; F01L 1/267; F01L 9/025; F01L 9/023; F01L 13/0005; F01L 1/2411; F01L 1/146; F01L 1/24; F01L 13/0015; F01L 13/065; F01L 1/3442; F02D 13/04
USPC ............ 123/321, 90.12, 90.16, 90.46, 90.55
See application file for complete search history.

(56) References Cited

U.S. PATENT DOCUMENTS

| | | | | |
|---|---|---|---|---|
| 5,829,397 A * | 11/1998 | Vorih | ................. | F01L 1/181 |
| | | | | 123/90.12 |
| 6,095,115 A * | 8/2000 | Fuchs | ................. | F02D 13/04 |
| | | | | 123/321 |
| 6,302,370 B1 | 10/2001 | Schwoerer et al. | | |
| 6,474,277 B1 | 11/2002 | Vanderpoel et al. | | |
| 6,510,824 B2 | 1/2003 | Vorih et al. | | |
| 6,736,092 B2 * | 5/2004 | Borean | ................. | F01L 9/02 |
| | | | | 123/198 F |
| 6,883,492 B2 * | 4/2005 | Vanderpoel | ................. | F01L 1/08 |
| | | | | 123/321 |
| 7,059,282 B2 | 6/2006 | Vorih et al. | | |
| 7,559,300 B2 * | 7/2009 | Ruggiero | ................. | F01L 9/021 |
| | | | | 123/90.12 |
| 8,079,338 B2 | 12/2011 | Schwoerer et al. | | |
| 8,516,984 B2 * | 8/2013 | Schwoerer | ................. | F01L 1/146 |
| | | | | 123/90.44 |
| 9,091,184 B2 | 7/2015 | Howell et al. | | |
| 2005/0000476 A1 | 1/2005 | Vanerpoel | | |
| 2005/0126522 A1 | 6/2005 | Ruggiero | | |
| 2005/0252484 A1 * | 11/2005 | Vanderpoel | ................. | F01L 1/08 |
| | | | | 123/321 |
| 2011/0067661 A1 | 3/2011 | Schwoerer | | |
| 2015/0345347 A1 * | 12/2015 | Yeager | ................. | F01L 1/24 |
| | | | | 123/90.12 |
| 2017/0081986 A1 * | 3/2017 | Wigsten | ................. | F01L 9/023 |

OTHER PUBLICATIONS

Written Opinion of the ISA for International Application No. PCT/US2019/050485 dated Dec. 10, 2019, 7 pages.

* cited by examiner

LOST MOTION VARIABLE VALVE ACTUATION SYSTEMS AND METHODS

RELATED APPLICATIONS AND PRIORITY CLAIM

The instant application claims priority to U.S. provisional patent application Ser. No. 62/729,214 filed on Sep. 10, 2018 and titled LOST MOTION HYDRAULIC VARIABLE VALVE ACTUATION SYSTEM AND METHOD, the subject matter of which is incorporated by reference herein in its entirety.

FIELD

The instant disclosure relates generally to systems and methods for actuating one or more engine valves in an internal combustion engine. In particular, embodiments of the instant disclosure relate to systems for enabling dependable and full operation of variable valve actuation (VVA) assemblies shortly following dry start of the engine. Embodiments of the instant disclosure further relate to systems having modular and compact packaging for add-on VVA assemblies. Embodiments of the instant disclosure further relate to systems for interfacing valve train components, such as push tubes, with master piston and other components in a master-slave VVA assembly. Embodiments of the instant disclosure further relate to systems for controlling the velocity of valve train components in lost motion systems, such as self-adjusting valve catches in master/slave piston components used in lost motion VVA devices.

BACKGROUND

Internal combustion engines are utilized ubiquitously in many applications and industries, including transportation and trucking. These engines utilize engine valve actuation systems that may primarily facilitate a positive power mode of operation in which the engine cylinders generate power from combustion processes. The intake and exhaust valve actuation motions associated with the standard combustion cycle are typically referred to as "main event" motions. Known engine valve actuation systems may provide for modified main event valve motion, such as early or late intake valve closing. In addition to main event motions, known engine valve actuation systems may facilitate auxiliary valve actuation motions or events that allow an internal combustion engine to operate in other modes, or in variations of positive power generation mode (e.g., exhaust gas recirculation (EGR), early exhaust valve opening (EEVO), etc.) or engine braking in which the internal combustion engine is operated in an unfueled state, essentially as an air compressor, to develop retarding power to assist in slowing down the vehicle. Further still, variants in valve actuation motions used to provide engine braking are known (e.g., brake gas recirculation (BGR), bleeder braking, etc.)

For both main event and auxiliary event valve operation, the engine cylinder intake and exhaust valves may be opened by respective fixed profile cams having fixed lobes that interact with respective valve trains. However, the use of fixed profile cams may present limitations. For example, the use of fixed profile cams may limit or make impossible the adjustment of valve motion, such as valve timing and lift, that is necessary for optimal main event and auxiliary valve operations at different engine operating modes, speeds and conditions.

VVA systems have been developed in the prior art to overcome the limitations associated with fixed cam valve actuation systems. VVA systems may include lost motion components to facilitate operation of an internal combustion engine in positive power and engine braking modes. Lost motion is a term applied to a class of technical solutions in which the valve motion governed by a cam profile may be modified with a variable length mechanical, hydraulic or other linkage in the valve train. Lost motion components are well-known in the art. These devices typically include elements that may, in a controlled fashion, collapse or alter their length or engage/disengage adjacent components within a valve train to alter valve motion. Lost motion devices may facilitate certain valve actuation motions during the engine cycle that vary from the motion dictated by fixed-profile valve actuation motion sources such as rotating cams. Lost motion devices may cause such motion to be selectively "lost," i.e., not conveyed via the valve train to one or more engine valves in order to achieve events that are in addition to, or variations of, main event valve motion. In a VVA lost motion system, a cam lobe may prescribe the "maximum" (longest dwell and greatest lift) motion needed for a full range of engine operating modes and conditions. A variable length system may be included in the valve train, intermediate of the valve to be opened and the cam, to subtract or "lose" part of the motion that would otherwise be imparted by the cam to the valve.

Unfortunately, while known VVA lost motion systems may provide advantages, their implementation may present challenges in the art in some respects. For example, during engine dry start or cold start, the working hydraulic components of known VVA lost motion systems may be without hydraulic fluid (oil), which may have drained from the components after engine operation ceases. Such loss of hydraulic fluid may require several engine cycles and/or engine warm up upon engine restart before full function of the VVA lost motion system is attained.

Other needs in the art relate to the desire for VVA lost motion assemblies that may be easily installed easily, and/or installed as add-on components to existing engine configurations in order to provide benefits compact and modular configurations of VVA lost motion systems. Modularity may offer benefits of ease of handling, shipping and installation. Relatedly, there is a need for compact, modular packaging of VVA lost motion components that may be easily integrated with existing engine structure and which provide for the retention of constituent parts in the assembly prior to installation.

Overhead valve engine configurations may utilize push tubes or push rods in the engine valve train. These components may interface with a master piston on a master piston/slave piston VVA lost motion assembly. During installation, existing VVA lost motion assemblies may require extensive manual effort to align the push tubes with a respective motion interface on the master piston or other components in the VVA lost motion assembly. Moreover, in addition to misalignment, existing push tube interface configurations may be prone to excessive friction and wear, poor lubrication, and less than optimal stability in operation.

Known lost motion VVA systems also present further challenges in controlling valve closing motion, namely, valve closing velocity. Since lost motion components in a valve train may cause engine valve motion to vary from the motion prescribed by the associated cam surface, such as in delayed intake valve closure, there is potential for the valves to excessive closing velocity, which, in the absence of appropriate control devices, could result in the valve "slamming" into its valve seat. Valve catches, such as those disclosed in U.S. Pat. No. 6,474,277, the subject matter of which is hereby incorporated by reference in its entirety, have been developed in the prior art to address the problem of excessive valve closing velocity in lost motion systems. However, such systems may not provide optimal control in some VVA environments. For example, such systems may require that components be manufactured with very low tolerances, which can be costly. Further, when utilized in master/slave piston components, such systems may exhibit high hydraulic resistance between the master and slave piston.

It would therefore be advantageous to provide systems and methods that address the aforementioned shortcoming and others in the prior art.

SUMMARY

Responsive to the foregoing challenges, the instant disclosure provides various embodiments of VVA assemblies and other components with improved features and advantages.

According to an aspect of the disclosure, there is provided an engine valve actuation assembly which provides for quick fill of lost motion VVA components following engine dry start. The system for providing variable valve actuation in an engine valve train may comprise: a housing; a master piston bore defined in the housing; a master piston cooperating with the master piston bore to define a master piston chamber; the master piston having a motion receiving interface for receiving motion from a motion source in the valve train; a slave piston bore defined in the housing; a slave piston cooperating with the slave piston bore to define a slave piston chamber; the slave piston having a motion transferring interface for transferring motion to a motion receiving component in the valve train; and a dry start hydraulic circuit cooperating with the master piston chamber for supplying working fluid to the master piston chamber during an engine start cycle.

The dry start hydraulic circuit facilitates the quick delivery of hydraulic fluid to the master-slave circuit in a lost motion VVA assembly. During initial dry start cycles of the engine and VVA assembly, the master piston is used to create lower pressure in the initially empty VVA system hydraulic circuits, thereby drawing in oil from a dry start reservoir through a high-pressure check valve into the master-slave circuit. The configuration of the dry start reservoir, and the low-pressure and high-pressure check valves in the dry start hydraulic circuit ensure that the dry start reservoir retains a supply of hydraulic fluid that does not leak down (deplete) when the engine is not operating. In addition, an accumulator in the dry start hydraulic circuit is configured with a bleed orifice that is occluded when the accumulator piston is bottomed in the bore, which occurs during initial engine dry start. This further ensures that the dry start hydraulic circuit retains sufficient hydraulic fluid in the dry start reservoir to provide for a rapid attainment of full function of the lost motion master-slave circuit upon engine restart.

According to an aspect of the disclosure, the master piston of the VVA assembly may be provided with advantageous features to ensure stability of operation and durability of the motion receiving interface, such as a master piston/push tube interface for the VVA assembly. An engine valve actuation assembly for providing variable valve actuation in an engine valve train may comprise: a housing; a master piston bore defined in the housing; a master piston cooperating with the master piston bore to define a master piston chamber; the master piston having a motion receiving interface for receiving motion from a motion source in the valve train; a slave piston bore defined in the housing; a slave piston cooperating with the slave piston bore to define a slave piston chamber; the slave piston having a motion transferring interface for transferring motion to a motion receiving component in the valve train; wherein the master piston motion receiving interface comprises a push tube receiving socket in the master piston for receiving a push tube end, the push tube receiving socket extending a sufficient depth within the master piston that the push tube end remains positioned in the master piston bore throughout operation. The push tube may be provided with a push tube cap that is slightly rounded on an end wall thereof. The push tube may extend deep inside of a push tube receiving socket formed on the master piston in such a manner that the push tube (or push tube cap) end is situated very close to the high-pressure face of the master piston. In this manner, the forces exerted by the push tube end are applied very close to the forces exerted on the master piston high pressure surface, reducing the potential for creating a moment, and resulting side loading, on the master piston and/or the push tube and end cap. This reduces lateral forces on the push tube and master piston, provides for more stable operation and reduces frictional loss and wear.

According to a further aspect, the motion receiving interface on the VVA assembly is provided with features for enhancing lubrication and reducing contact stresses. Features are provided for collecting high pressure hydraulic fluid at the push tube/master piston interface. Such fluid may flow as leakage from the master piston. An annular groove and one or more radially extending ports formed in the push tube cap may collect and convey oil to the interior master piston push tube socket during operation, thereby lubricating the interior of the master piston and the push tube and/or end cap. Contact stresses may be reduced by an axisymmetric concave surface formed in an end wall of the master piston push tube socket as well as an axisymmetric convex surface, of smaller radius, formed on the end of the push tube cap. This configuration provides for a centering force on the push tube relative to the master piston socket during operation and further ensures proper alignment and minimal side loading of the push tube end cap and master piston.

According to an aspect, the VVA system may be provided as a modular, integrated package, which includes the components of the dry start hydraulic circuit and the master piston push tube interface situated in compact fashion in a VVA housing that may have the form of a rocker pedestal and that may be fit or retrofit onto an engine as a unitary assembly and using minimal fastening implements and assembly resources.

According to an aspect, the VVA system may be provided with a self-adjusting valve catch (SAVC) in order to control the closing velocity of a slave piston and thus the closing velocity of one or more engine valves. A valve catch seat may be secured within a complementarily shaped valve catch seat recess formed in the housing between the slave piston bore and the master piston bore. The valve catch seat may include a central passage surrounded by an annular seating surface. The slave piston may include an inner cavity for receiving a control pin, which is provided with a control pin collar. The control pin collar functions to permit guided movement of the control pin within the cavity, keeping the control pin centered. A control pin collar includes an upper spring guide, which cooperates with control pin spring, and a lower spring guide, which cooperates with a check disk spring. A control pin spring provides a downward (seating)

biasing force on the control pin relative to the slave piston. A check disk spring provides a downward (seating) biasing force on the check disk relative to the position of the control pin collar. Ports in the control pin may be progressively occluded by the check disk during a valve catch mode of operation, When the engine valve approaches the engine valve seat, especially when decoupled from the cam due to flow through the high-speed solenoid valve, the check disk may seat, causing the oil from the slave piston plenum to flow through a plurality of holes in the control pin that are occluded by a metering edge of the check disk. The control pin holes are progressively occluded as the control pin descends, causing an increase in slave piston pressure, which slows the engine valve and associated valvetrain components. The slave piston may be provided with an auto-lash chamber between the top of the slave piston bore and the control pin collar. The auto-lash chamber may be filled by leakage of oil past the slave piston control collar. The leakage-filled auto-lash ensures that the control pin seats on the valve catch seat when the engine valve seats on the valve seat. The SAVC ensures that the closing velocity of control pin and thus the closing velocity of slave piston and, consequently, the closing velocity of the engine valves does not exceed acceptable levels as the control pin nears the seating surface. According to further aspects of the disclosure, guiding features of the check disk spring and the control pin ensure that the control pin ports are not contacted by the spring, thus avoiding avoid wear of the port edges by the spring.

Other aspects and advantages of the disclosure will be apparent to those of ordinary skill from the detailed description that follows and the above aspects should not be viewed as exhaustive or limiting. The foregoing general description and the following detailed description are intended to provide examples of the inventive aspects of this disclosure and should in no way be construed as limiting or restrictive of the scope defined in the appended claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto. In the following descriptions of the figures, all illustrations pertain to features that are examples according to aspects of the instant disclosure, unless otherwise noted.

DETAILED DESCRIPTION

As used herein, the term "in fluid communication" is intended to denote a relationship between two or more elements or components in which fluid may flow constantly, intermittently or selectively, and is not necessarily limited to direct, constant flow between such elements or components but may involve fluid flow through intermediate components, for example, through a check valve, that may be disposed intermediately between the two or more components described as being "in fluid communication."

Figure 1:
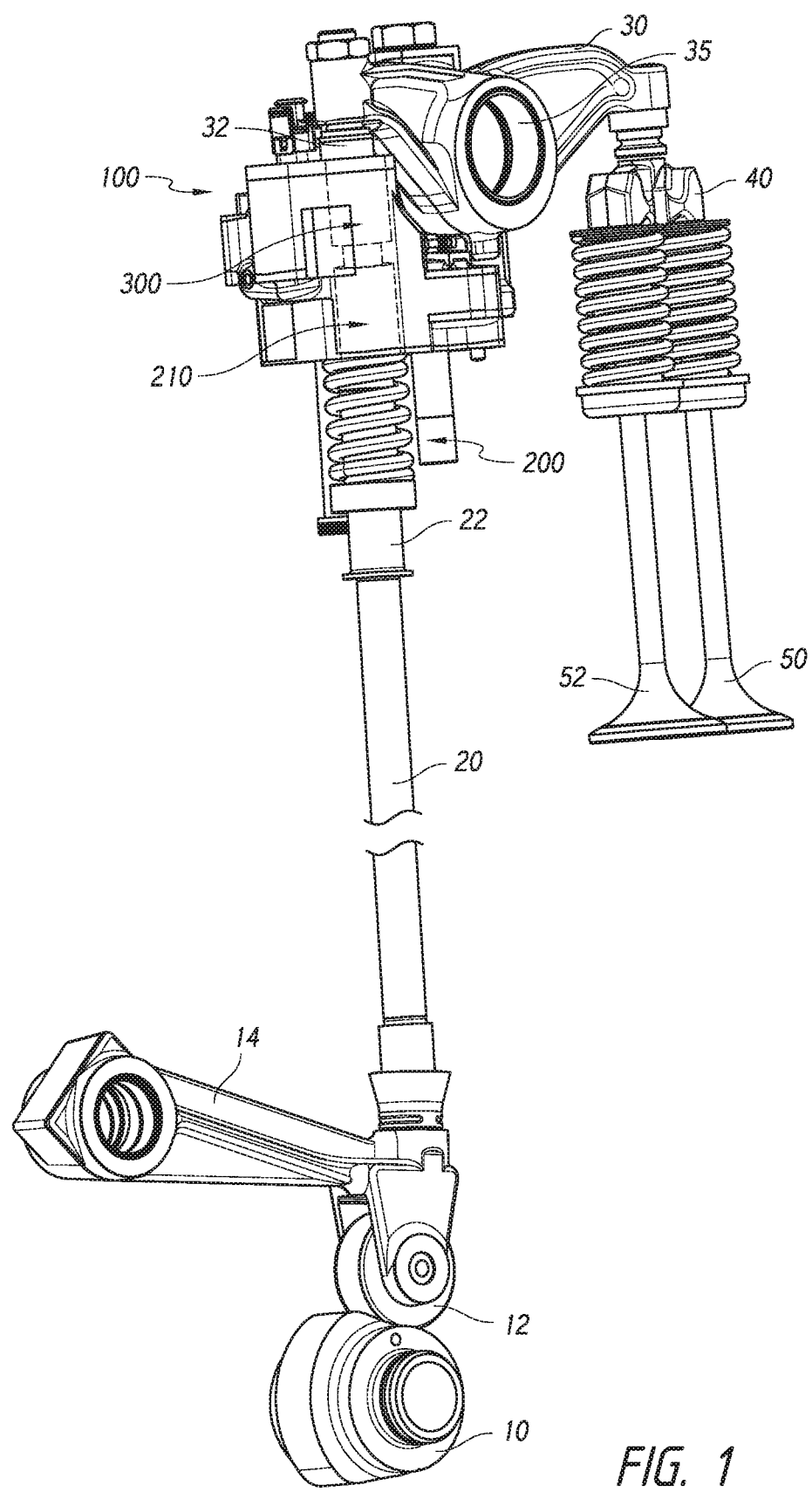
FIG. 1 is a pictorial illustration of an example modular lost motion VVA (LMVVA) assembly and an example engine valve train environment.

FIG. 1 shows an example modular lost motion VVA assembly 100 in an engine valve train environment. A motion source, shown in the form of a lost motion VVA cam 10, may impart motion to one or more motion receiving components, which, in this example, may be a cam follower 12, journaled in a cam follower arm 14 that may be pivotably mounted to permit the cam follower 12 to follow the working surface or profile of cam 10. Cam follower 12 cooperates with a push rod 20, which extends upward and may interact with a master piston assembly 200 on the VVA assembly 100. Push tube 20 may extend into a push rod cap 22, which in turn may extend into a master piston 210 of the master piston assembly 200. Master piston 210 may interact with a slave piston 310 of a slave piston assembly 300 to provide for lost motion, as will be further described. Slave piston 310 may impart motion to a rocker arm 30 through a swivel foot or "e-foot" 32 extending therefrom. Rocker arm 30 may impart motion to one or more engine valves 50, 52 via a valve bridge 40.

As will be recognized from the instant disclosure, the VVA assembly 100 may be secured to an engine head assembly (omitted for clarity from FIG. 1) as an add-on component or replacement component for a rocker shaft pedestal. The VVA assembly 100 may include integrated structure for supporting the rocker shaft 35, which supports the rocker arm 30 for pivoting movement, as will be further described.

Figure 2:
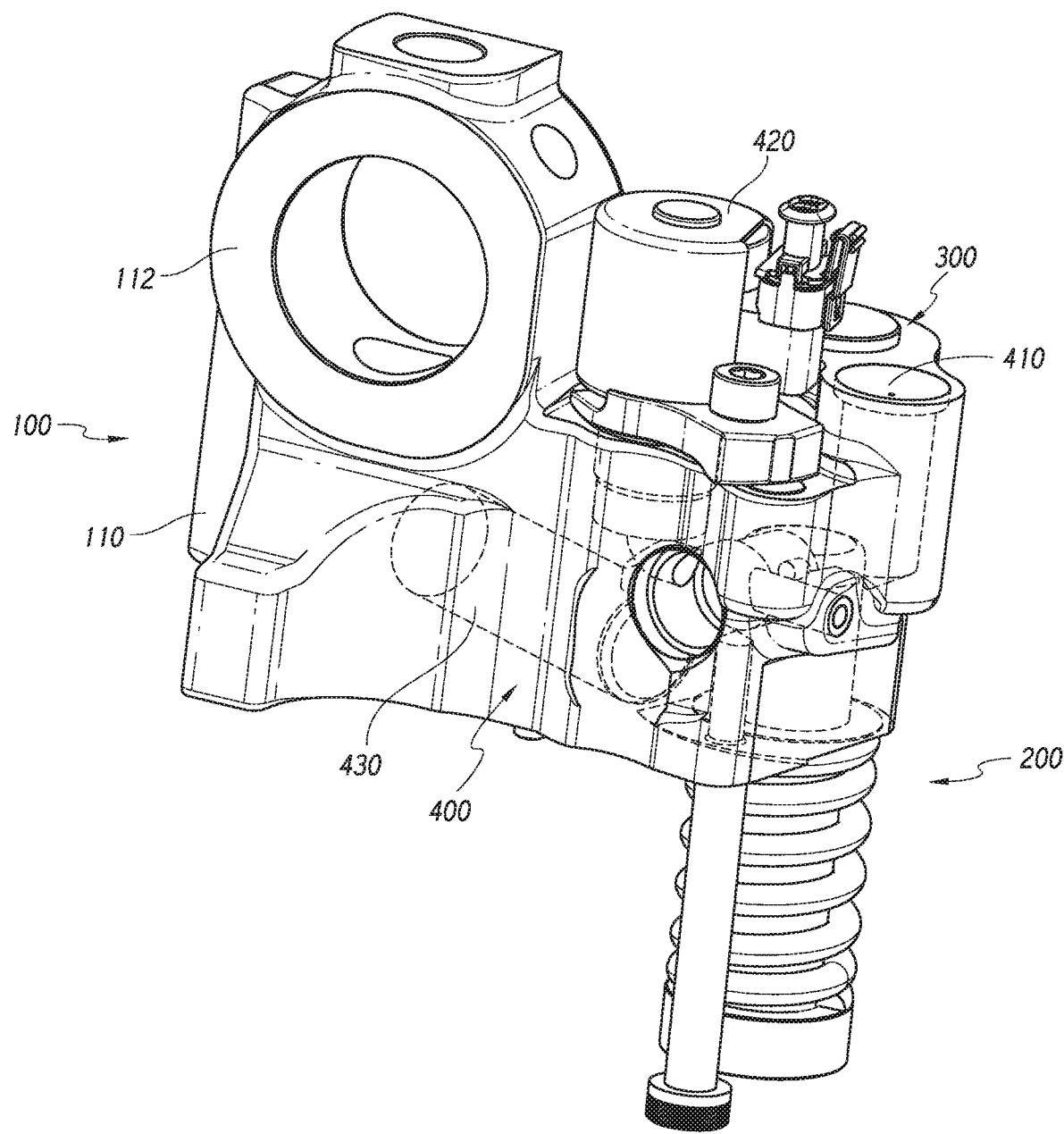
FIG. 2 is a pictorial illustration of the example modular LMVVA assembly shown in FIG. 1.
Figure 3:
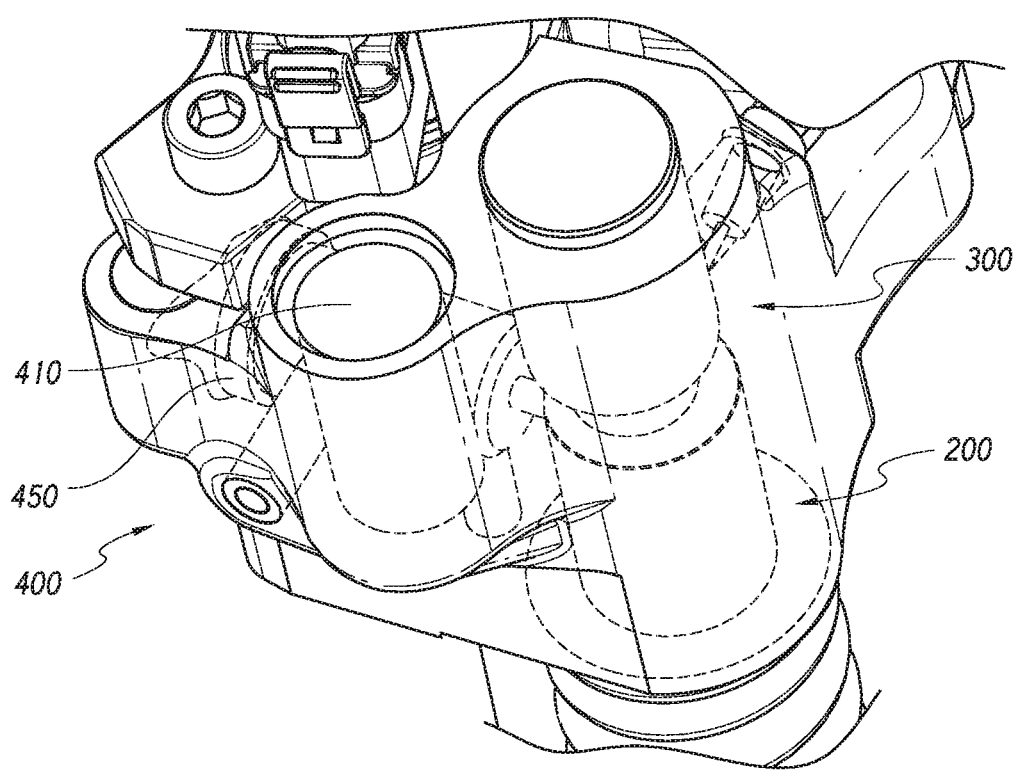
FIG. 3 is a detailed pictorial illustration of components the example LMVVA assembly shown in FIG. 2.
Figure 4:
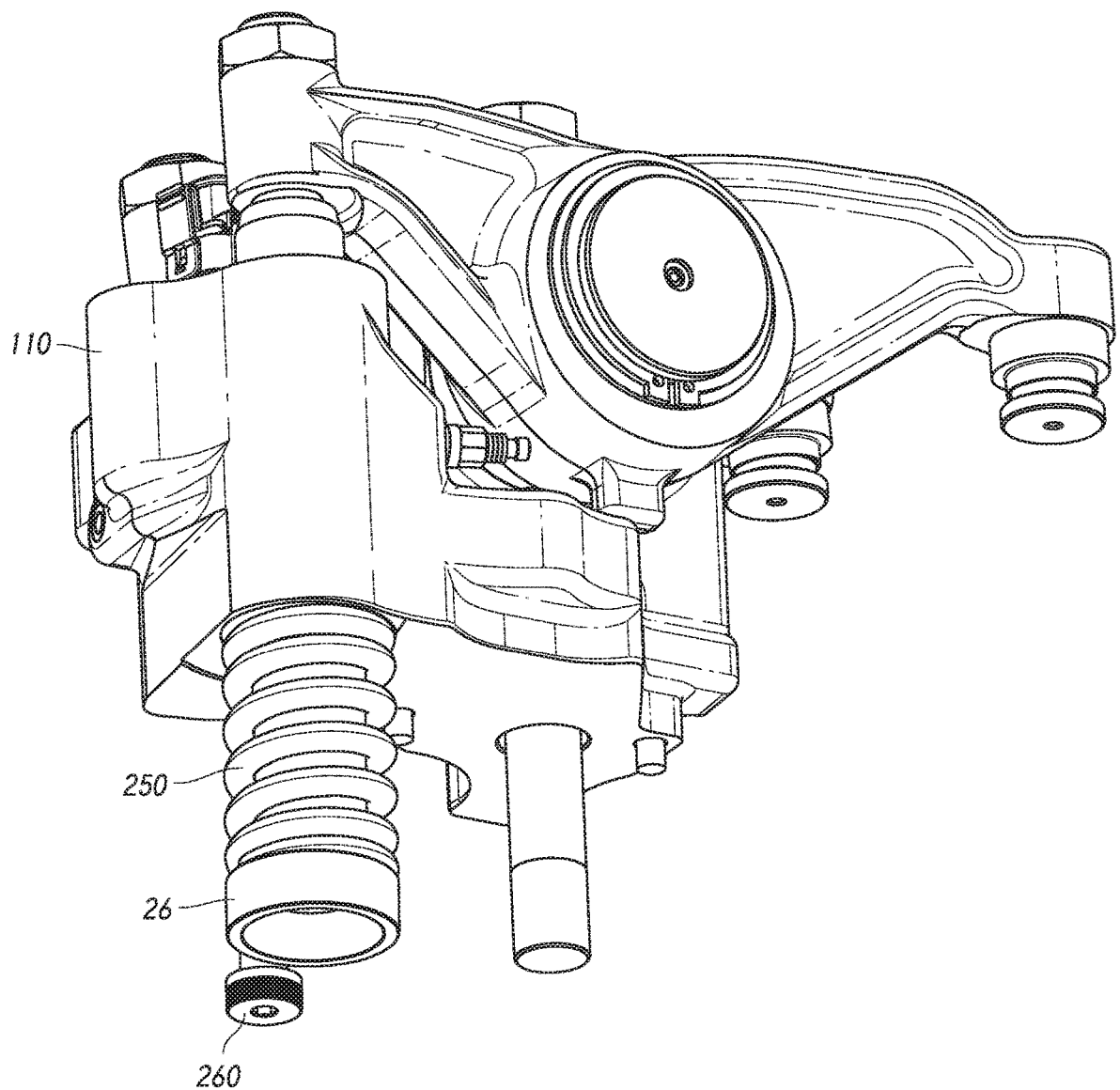
FIG. 4 is pictorial illustration of additional components and a lower mounting surface of the example LMVVA assembly shown in FIG. 2.

Referring additionally to FIGS. 2-4, in accordance with aspects of the disclosure, the VVA assembly 100 may have a compact, modular construction. Such construction provides for the integration of a number of components into the VVA housing 110 in such a manner that the VVA assembly may be installed as an add-on component without interfering with other components that may be in its vicinity in an engine head environment. The housing 110 may be constructed for attachment to an existing pedestal or post extending from the engine head. The VVA assembly integrated components may include a rocker shaft support 112, master piston assembly 200, slave piston assembly 300, and a dry start subsystem 400. As will be further described, the dry start subsystem 400 may include a dry start hydraulic circuit providing fluid communication between dry start reservoir 410, high speed solenoid valve (HSSV) 420, accumulator 430, high pressure check valve 450 and low-pressure check valve 460, as well as hydraulic fluid paths connecting the same and extending within the housing 110. These and other components, as will be described, are advantageously positioned and integrated into the VVA assembly housing 110 to provide a modular and compact VVA package that may be conveniently transported and installed as a modular unit. This VVA package configuration achieves the advantages described herein and others.

Figure 5:
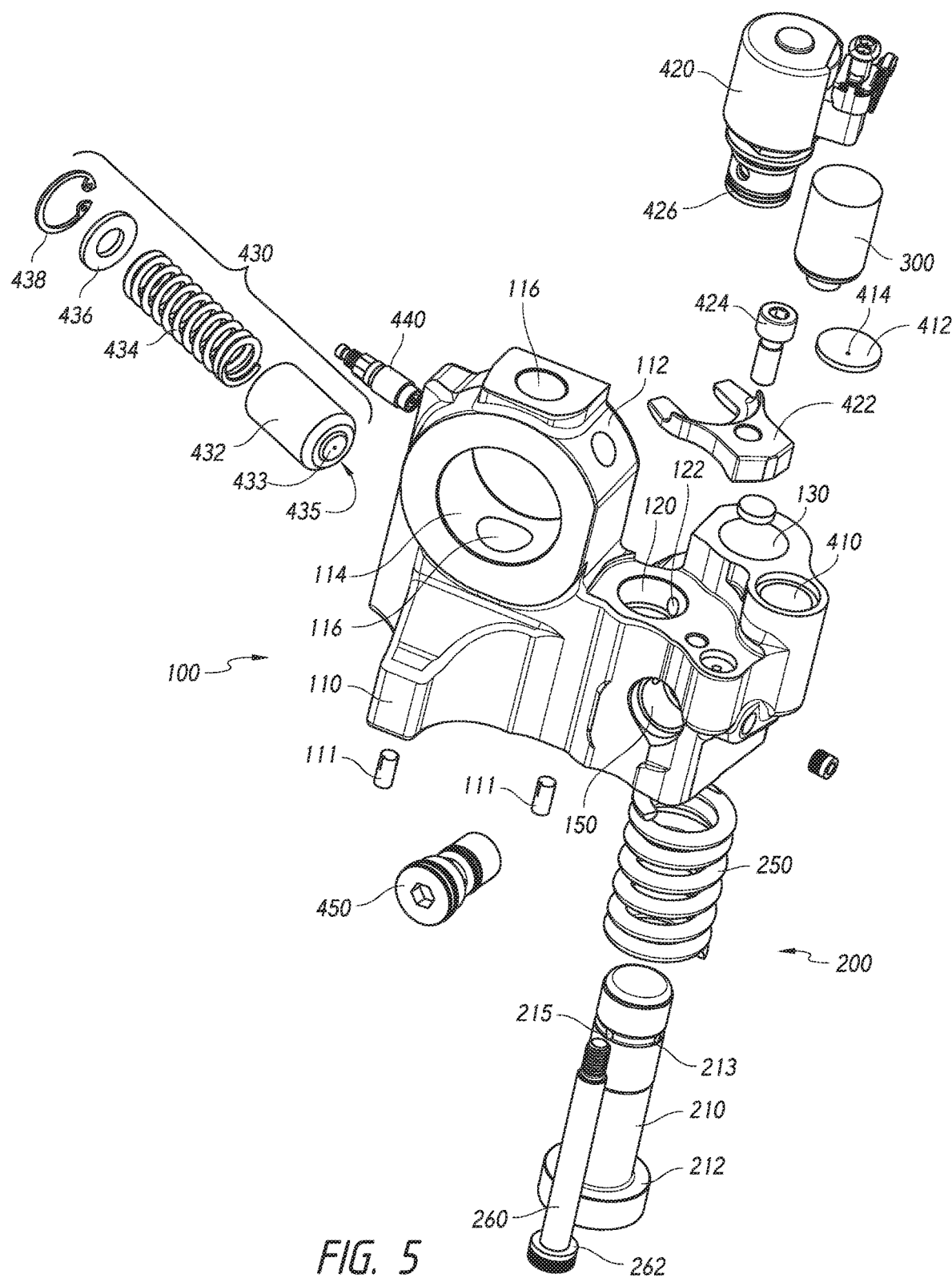
FIG. 5 is an exploded view of an example LMVVA assembly and components thereof.
Figure 6:
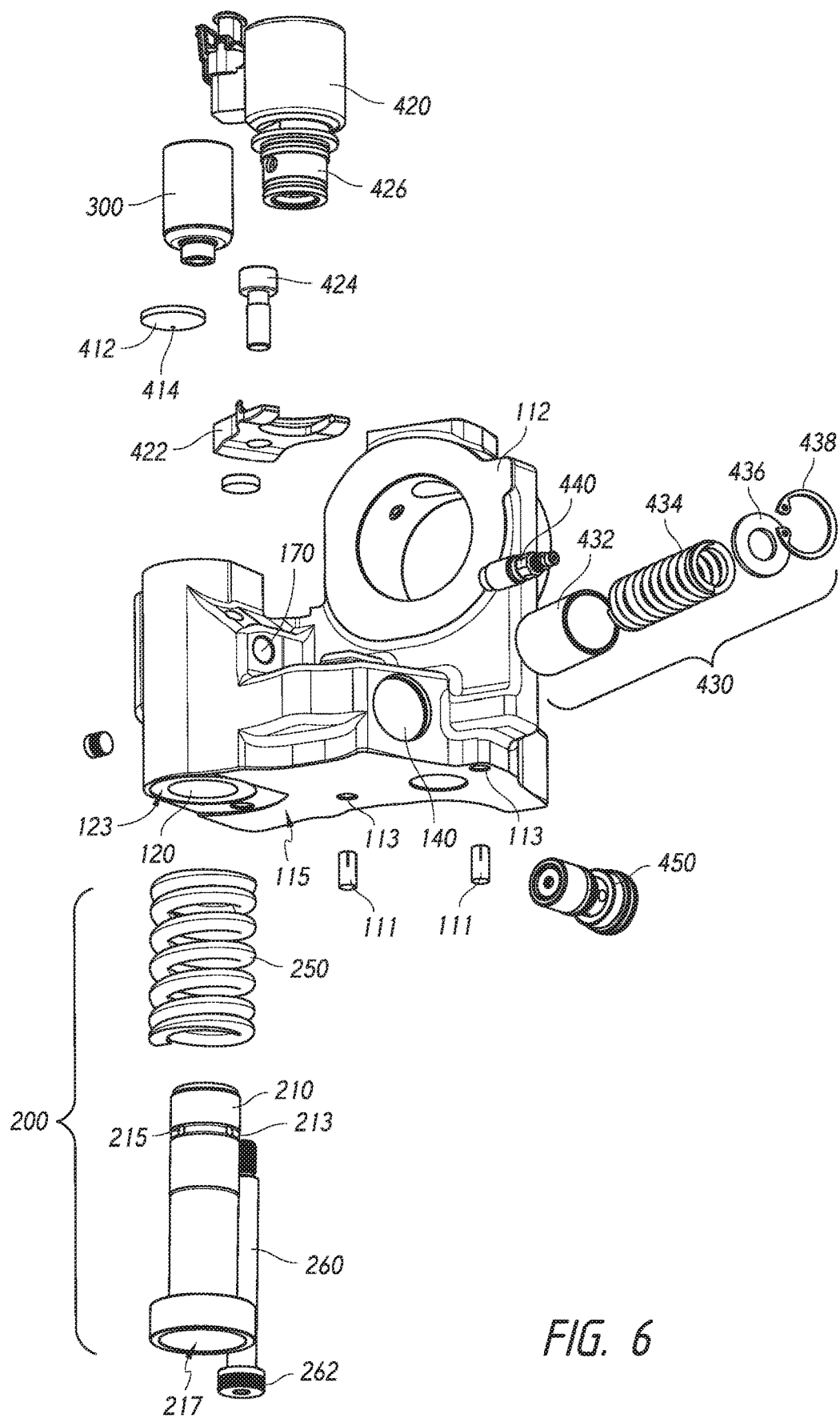
FIG. 6 is another exploded perspective view of the LMVVA assembly of FIG. 5 and components thereof.

FIGS. 5 and 6 are exploded views of the example VVA assembly 100 of FIGS. 1-4, according to aspects of the disclosure. Housing 110 may include a rocker shaft support bore 114 disposed on the rocker shaft support 112. A mounting bore 116 may extend through the housing 110 and receive a fastener (i.e., bolt) for securing the housing 110 to a mounting surface within an engine head assembly (not shown). A pair of alignment pins 111 may be disposed in respective alignment pin bores 113 in a mounting surface 115 on the underside of housing 110 to facilitate stable, aligned mounting and installation. Housing 110 may include a HSSV bore 120 for receiving a valve head 426 of a HSSV 420. A mounting bracket 422 and bracket fastener 422 may secure the HSSV 420 to housing 110. As will be recognized HSSV bore 120 may include one or more fluid passages 122 in communication therewith for conveying hydraulic fluid to/from the bore 120 and, in an open state of the valve, through or past the valve head 426 of HSSV 420. According to aspects of the disclosure, a dry start reservoir 410 may be defined within the housing 110 and sealed with a reservoir cap 412 (i.e., via threaded coupling or press fit). Reservoir cap 412 may have a reservoir bleed orifice 414 therein for permitting bleed to ambient of hydraulic fluid from the reservoir. This configuration has advantages for manufacturing, particularly for a large single cylinder head.

Master piston 210 may include an annular collar or shoulder 212 extending around a lower portion thereof and a master piston socket 217 (FIG. 6) defined therein for receiving a push tube end or push tube cap. Annular shoulder 212 may define a spring seat for master piston spring 250. Another spring seat surface 123 may be defined on housing 110 around the master piston bore 120 for engaging an opposite end of spring 250. Master piston 210 may include an outer groove 213 on an upper portion thereof and including a number of radially extending ports 215 defined therein for communicating oil from outside the master piston 210 to an interior socket 217 for enhancing lubrication of the push tube/master piston interface using master piston leakage, as will be further described herein. A master piston retainer 260 may be comprised of a threaded fastener that may be secured to housing 110 such that a bolt head 262 may engage and retain the annular shoulder 212 of master piston 210, thereby securing the master piston 210 and spring 250 in an installation position on the housing 110. As will be recognized from the instant disclosure, this configuration permits the master piston 210 and spring 250 to be secured to the housing 110 during installation, with the master piston 210 retained in a fully inserted position, for example, relative to master piston bore 120, and spring 250 compressed. As will be recognized from the instant disclosure, once the VVA assembly is installed, the master piston spring 250 advantageously provides a biasing force on the master piston 210 (FIG. 1) and provides for cam follow of the master piston, push tube 20 and cam follower, regardless of the operation of the master-slave lost motion components of the VVA assembly. In particular, the master piston 210 will follow the cam closing profile during dry start so that the master piston will act as a pump to draw oil from the dry-start reservoir into the high-pressure circuit.

Still referring to FIGS. 5 and 6, a slave piston assembly 300 may be installed in a slave piston bore 130, which permits the slave piston assembly 300 to interact with the master piston 210 and to convey motion to a motion receiving component (i.e., swivel foot in FIG. 1) in the valve train. Slave piston assembly 300 may include a self-adjusting valve catch (SAVC) system to control engine valve closing velocity. Details of the master/slave piston interaction and the SAVC according to aspects of the disclosure, will be explained below.

An accumulator assembly 430 may be installed in an accumulator bore 140 provided in the housing. The accumulator assembly may include an accumulator piston 432 having a sealing surface 433 on an end wall thereof and a central bleed orifice 435 centered within the sealing surface 433. An accumulator spring 434 may be housed within the interior of accumulator piston 432 and engage the piston end wall. The accumulator assembly 430 may be retained in the accumulator bore 140 of housing 110 by a C-clip retainer 436, which also retains a spring seat/washer 438, which engages an end of the accumulator spring 434 that is opposite the piston end wall. The accumulator assembly 430 functions to accumulate a pressurized supply of hydraulic fluid during normal (steady state) engine operation with the piston moving against the biasing force of spring 434 until equilibrium is reached and an amount of oil is accumulated within a chamber defined by the 432 piston and the bore 140. According to an aspect of the disclosure, bleed orifice 435 provides for a flow of hydraulic fluid through the accumulator piston 432 for the purpose of removing heat that is generated mainly in the valve catch and HSSV. While the dry start reservoir vent orifice may provide some bleed cooling, the accumulator bleed cooling orifice 435 may be more effective since hot oil from the high-pressure circuit flows primarily to the accumulator. However, according to a further aspect of the disclosure, and as explained in more detail below in reference to FIG. 7, when engine operation ceases, and during a dry start (restart) cycle, the biasing force of spring 434 will move the piston 432 into engagement with an end wall of the bore 140, preventing any flow through bleed cooling orifice 435.

Two check valves associated with the dry start hydraulic system may be installed in the housing 110. A low-pressure check valve (LPCV) 440 may be disposed in a low-pressure check valve bore 170, having ports therein for permitting fluid communication between the LPCV and other system components. A high-pressure check valve (HPCV) 450 may be disposed within a high-pressure check valve bore 150, which likewise may have ports therein for permitting fluid communication between the HPCV 450 and other system components.

Figure 7:
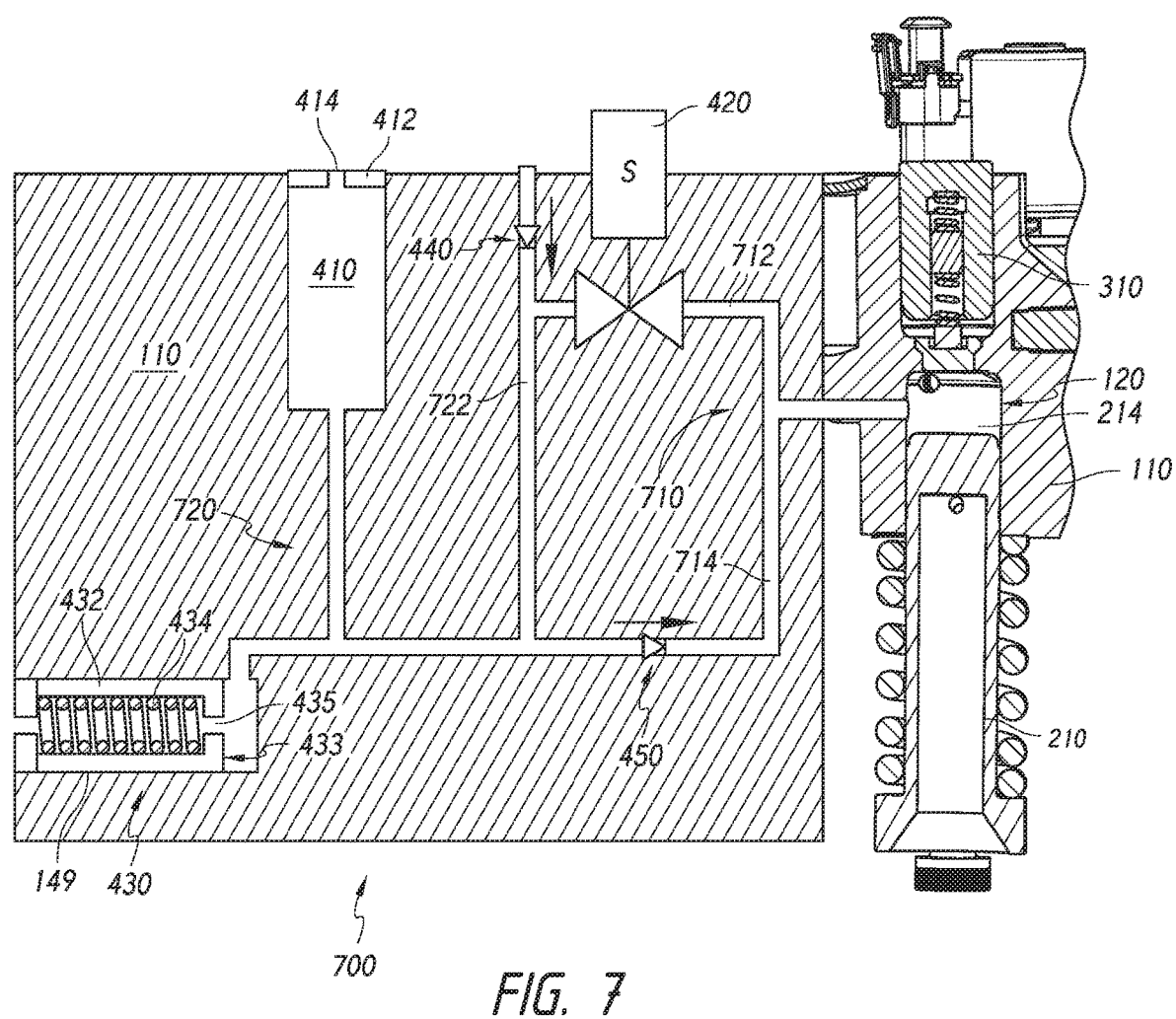
FIG. 7 is a schematic diagram of an example hydraulic dry start circuit, which may be implemented in an LMVVA assembly such as that illustrated in FIGS. 1-6.

FIG. 7 is a schematic illustration of an example dry start hydraulic circuit 700 which may be implemented as part of the dry start subsystem 400 (FIGS. 2-4) to achieve the advantages described herein. The hydraulic circuit may be implemented, in part, as a series of conduits or passages provided in the housing and providing fluid communication between the components depicted in the schematic drawing, i.e., accumulator, check valve, HSSV. According to an aspect, all components and conduits or passages may be integrated into the housing to provide a modular assembly that may be retro-fit onto an existing engine in place of or in addition to a rocker pedestal, for example. A master piston chamber 214 may be defined by the master piston 210 disposed in a master piston bore 120 defined in the housing 110. A high-pressure hydraulic sub circuit 710 may include a first fluid passage from the master piston chamber 214 to the HSSV 420, which may be a normally-open solenoid valve that closes when energized, and a second fluid passage 714 from the master piston chamber 214 to a high-pressure check valve 450. A low-pressure hydraulic sub circuit 720 may include a low-pressure check valve 440 disposed in a fluid passage 722 providing engine oil to the VVA assembly HSSV 420, dry start reservoir 410, having cap 412 and orifice 414, and accumulator 430, having accumulator piston 432, sealing surface 433 and bleed cooling orifice 435. The dry start reservoir is preferably located near the HPCV in the hydraulic circuit. As will be recognized, the low-pressure hydraulic sub circuit 720 is selectively isolated from the high-pressure hydraulic sub circuit 710 by way of check valve 450 and HSSV 420.

During normal engine operation, the high-speed solenoid valve 420 may be energized and thus closed prior to the start of cam lift. In this configuration, the master piston 210 and push tube 20 (FIG. 1) may nearly follow the profile of cam 10. The slave piston 310, and thus the valve bridge 40 and intake valves 50, 52 (FIG. 1) may have lower opening lift due to hydraulic compliance within the master-slave piston components. During normal operation, the high-speed solenoid valve 420 may be intermittently de-energized and thus open to achieve a desired intake valve closing timing. As the slave piston closes, fluid flows from the slave piston chamber to the master piston chamber 214 and through the high-speed solenoid valve 420 to the accumulator 430. The accumulator 430 and reservoir 410 are each provided with bleed flows through a reservoir bleed orifice 414 and an accumulator bleed cooling orifice 435, which bleed to ambient. Below a threshold intake valve lift, for example, 3.0 mm, a self-adjusting valve catch (SAVC) in the slave piston assembly 300, the details of which will be explained, may provide for reduced valve seating velocity by progressively throttling flow out of the slave piston plenum. The SAVC may cause slave piston pressure to rise, thereby providing a force acting through the valve rocker to slow the intake valve to an acceptable seating velocity. The high-pressure circuit 710 refills on the closing portion of the cam, and oil flows from the accumulator to the master piston through both the HSSV and the HPCV. When the accumulator pressure drops below the VVA oil supply pressure, refill oil may flow from the VVA oil supply to the accumulator 430 and reservoir 410.

On engine shutdown, the HSSV 420 opens, the valve springs close the engine valves and retract the slave piston to the top of the slave piston bore as oil flows out of the high-pressure circuit through the HSSV 420. The accumulator spring 434 retracts the accumulator piston 432 as oil flows out of the low-pressure circuit through the accumulator bleed cooling orifice 435. The amount of oil in the high-pressure circuit on engine shutdown will vary depending on the position of the master piston, with the minimum amount of oil on cam peak lift. If the engine is shut down for an extended period, additional oil may leak out of the hydraulic circuits. Oil is retained in the dry start reservoir because the LPCV, HPCV, and the accumulator bleed cooling orifice 435 are closed.

During dry start, the initial conditions will typically be that the intake valves are closed and the cam may be at any lift and the hydraulic circuits may have little to no oil, except for the dry start reservoir 410. This is because oil drainage from the VVA system may occur following engine shutdown. Thus, without hydraulic fluid in the master-slave circuit, the worst case for VVA refill occurs with the cam on peak dwell. When the VVA supply oil pressure in passage 722 is below the pressure required to actuate the piston of accumulator 430, the accumulator bleed cooling orifice 435 is occluded by the accumulator piston and thus oil may not bleed from the accumulator. As will be recognized from the instant disclosure, the accumulator spring 434 may be installed with a preload to ensure that the accumulator piston 432 remains bottomed in the accumulator bore 149 when the oil pressure is at a level that is sufficient to refill the high-pressure circuit. The accumulator spring preload is set to keep the accumulator piston on the top of the bore only during dry start when the oil supply pressure is between ambient pressure and a level that is significantly lower than the minimum oil supply pressure at low idle and insufficient to refill the high-pressure circuit. In other words, the accumulator piston refill pressure will typically be set at a pressure that is higher than the pressure needed to refill the high-pressure circuit.

The HSSV 420 is kept in a closed position during dry start in order to retain oil in the high-pressure circuit 710. As the engine cranks during startup, the master piston may reciprocate within the master piston chamber, generating pressure in the master piston plenum that is sufficiently below ambient to overcome the HPCV cracking pressure of typically 0.3 bar. This permits oil to be drawn by the master piston from the dry start reservoir 410 through the HPCV 450. The dry start reservoir is located close to the HPCV to avoid overcoming the LPCV cracking pressure, which could draw air into the system. The accumulator piston will be at the top of the bore, thereby occluding the bleed cooling orifice 435. During the cam opening profile, the master piston check valve closes, and any oil in the master piston will be pumped to the slave piston. When the slave piston is sufficiently filled, the engine valves will be actuated. On subsequent cycles, more oil is suctioned from the reservoir by the master piston on the cam closing profile. Thus, the intake valve lift will be the full cam lift with progressively decreasing lash (increasing lift) on each cycle as more oil is pulled into the master piston chamber. In this manner, the lost motion system may rapidly reach a state, following engine startup, where the master-slave piston components receive sufficient hydraulic fluid to provide full VVA cam lift, rather than operating for an extended period under dry start (i.e., insufficient hydraulic fluid in the master-slave piston components to permit full operation).

In a preferred implementation, the dry start reservoir will be located at a higher elevation than the master piston port. However, since the system can overcome a small head difference between the reservoir and the master piston port, other relative elevations for the dry start reservoir may be implemented within the VVA housing 110. It will be recognized from the instant disclosure that the HPCV provides advantages in the dry start hydraulic circuit, namely, that the presence of the HPCV permits the HSSV to be in a closed state during dry start and the HPCV may be used to fill and retain oil in the high-pressure circuit. Stated another way, without the HPCV, it would be necessary to control the HSSV during dry start to be open during cam closing to allow for the draw of oil from the dry start reservoir to the high-pressure circuit and closed during cam opening, and during any peak dwell, to retain oil in the high-pressure circuit.

Figure 8:
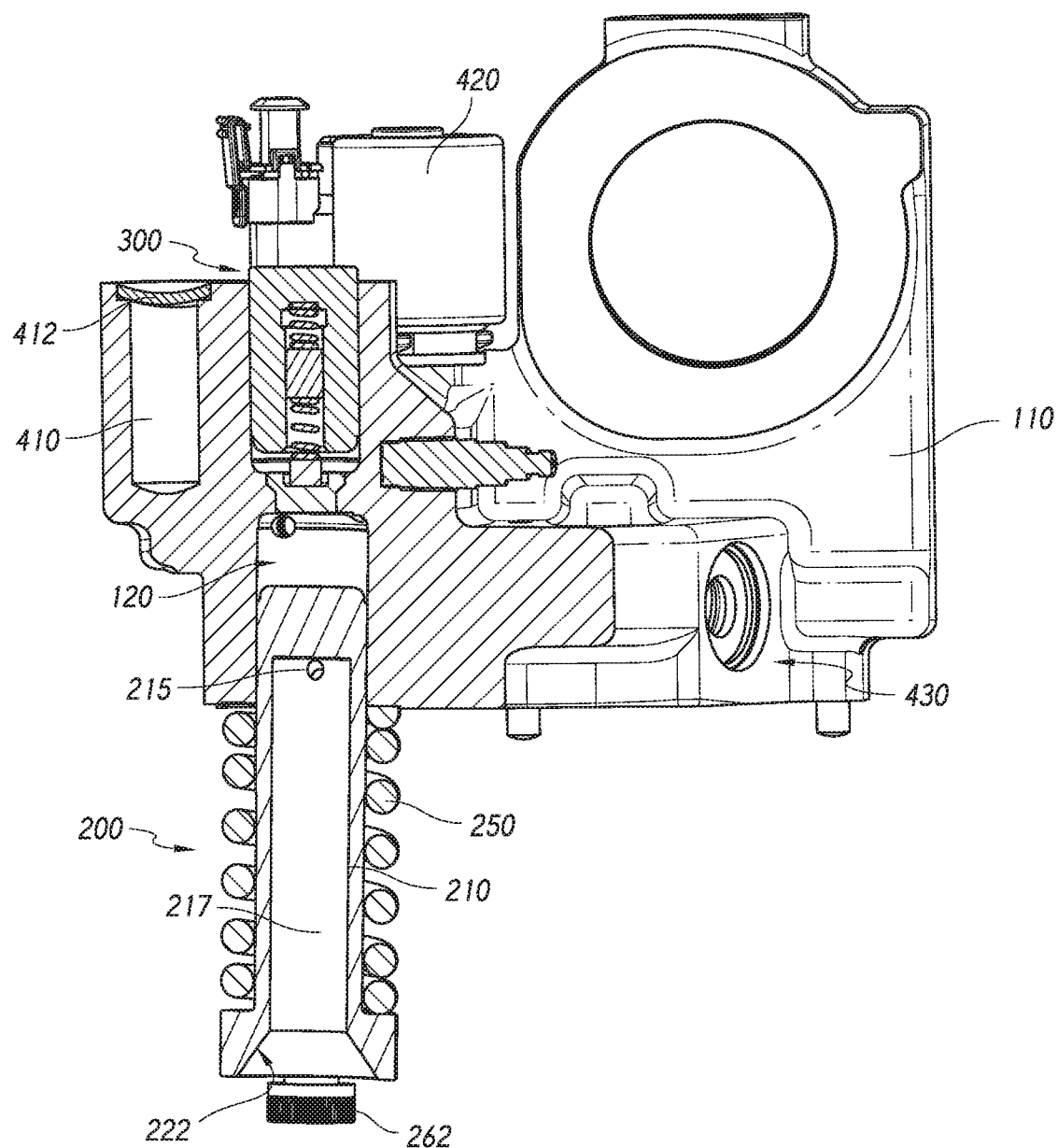
FIG. 8 is a cross-section of the LMVVA assembly of FIGS. 1-6.
Figure 9:
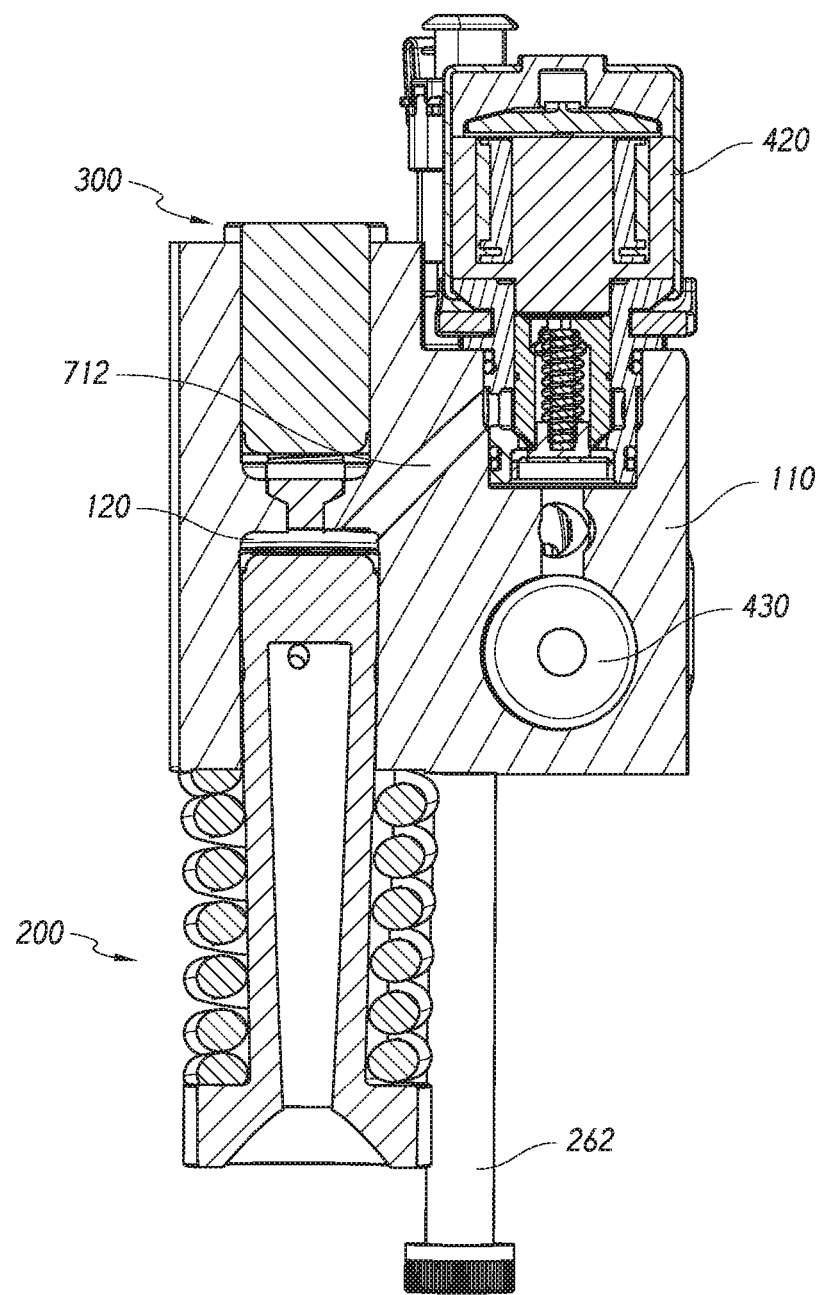
FIG. 9 is another cross-section of the LMVVA assembly of FIGS. 1-6.
Figure 10:
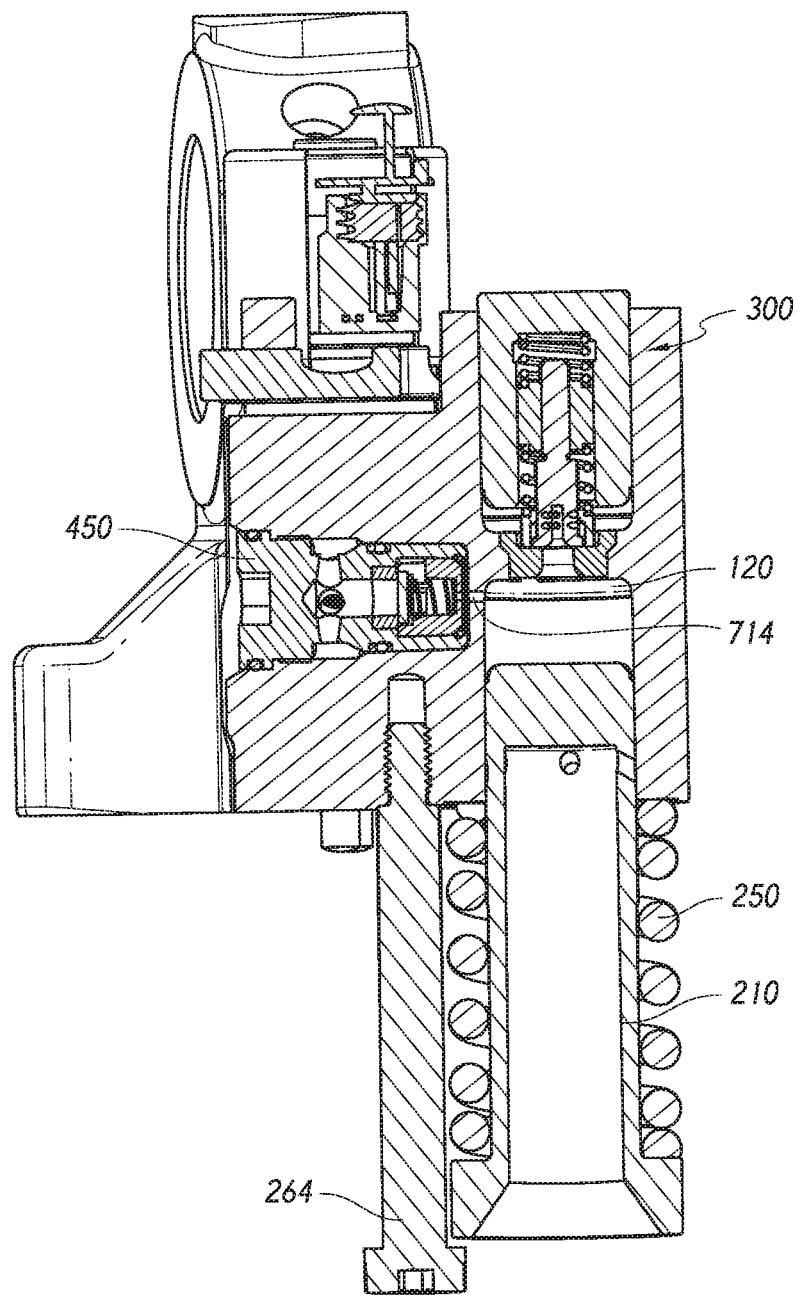
FIG. 10 is a third cross-section of the LMVVA assembly of FIGS. 1-6.

FIGS. 8-10 are cross sections taken through different planes in the example VVA assembly of FIGS. 1-7, and further illustrating details of the example master piston assembly 200 and slave piston assembly 300. FIG. 8 is a view from the side of the housing 110 that integrates the accumulator 430. This view also shows further details of the master piston assembly 200, including master piston 210, master piston chamber 120, push tube receiving socket 217, tapered annular alignment surface 222 on an entrance to the push tube receiving socket 217, one of the master piston ports 215 and piston retainer 262. HSSV 420 and slave piston assembly 300 are also shown in an installed position in the housing 110. FIG. 9 is a sectional view in the plane of a high-pressure hydraulic passage 712 between the master piston chamber 120 and the HSSV 420. In this view, the end of accumulator 430 is visible. FIG. 10 is another cross-section showing a high-pressure hydraulic passage 714 between the HPCV 450 and the piston chamber 120.

Figure 11:
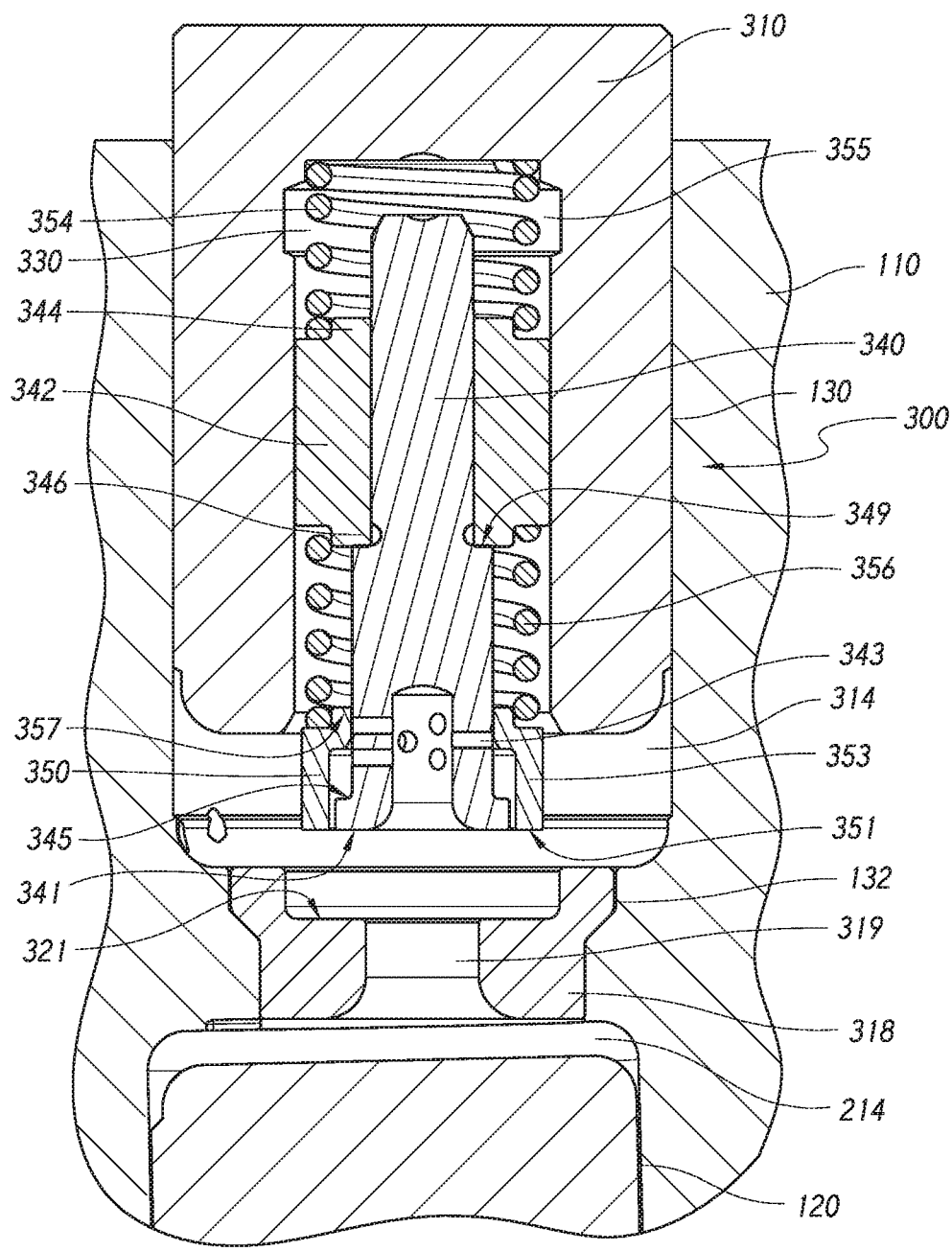
FIG. 11 is a detailed cross-section of an example slave piston and valve catch assembly in the LMVVA assembly of FIGS. 1-6.

FIG. 11 is a cross-section of an example slave piston and SAVC according to aspects of the disclosure. Slave piston 310 may be disposed in a slave piston bore 130 in the VVA housing 110, defining with the slave piston bore, an expansible slave piston chamber 314 in fluid communication with the master piston chamber 214. A valve catch seat 318 is secured within a complementarily shaped valve catch seat recess 132 formed in the housing between the slave piston bore 130 and the master piston bore 120. Valve catch seat 318 includes a central passage 319 surrounded by an annular seating surface 321. Slave piston 310 may include an inner cavity 330 for receiving a control pin 340, which is provided with a control pin collar 342, which may be press-fit thereon or secured with a retaining pin (not shown). Control pin collar 342 may function as a control piston and to permit guided movement of the control pin 340 within the slave piston bore or cavity 330, keeping the control pin 340 centered within the slave piston cavity 330. Control pin 340 includes a check disk stop 345 that limits the downward motion of the check disk 350 relative to the control pin 340. Control pin 340 may include a shoulder 349 to provide for positive positioning and installation of control pin collar 342. Control pin collar 342 includes an upper spring guide 344, which cooperates with control pin spring 354, and a lower spring guide 346, which cooperates with a check disk spring 356. Control pin spring 354 provides a downward (seating) biasing force on the control pin 340 relative to the slave piston 310. Spring 356 provides a downward (seating) biasing force on a check disk 350 against an annular seating surface 321 relative to the position of the control pin collar 342. Check disk 350 may be slidably disposed on control pin 340. According to an aspect of the disclosure, the control pin/collar assembly defines an auto-lash chamber 355 at the top of the inner cavity 330 of slave piston 310. Oil may flow (leak) between the slave piston 310 and auto-lash chamber 355 through the clearance between the control pin collar 342 and the slave piston 310 in response to the relative pressures between the chambers defined by each end of the control pin collar 342.

Control pin 340 includes an annular control pin seating surface 341 which engages the valve catch seat annular seating surface 321. Valve catch seat annular seating surface 321 thus provides a positive stop for the control pin. As the auto-lash chamber 355 may fill with hydraulic fluid, the positive stop of seating surface 321 operates to limit the auto-lash movement of the control pin 340. Likewise, the check disk 350 includes an annular check disk seating surface 351, which engages the valve catch seat annular surface 321. Control pin 340 includes a plurality of control pin ports 343, which may be round, slotted or another shape, which permit flow through the control pin 340. The check disk 350 operates to direct flow through the control pin ports 343 and includes a metering edge 357, which operates to progressively occlude the control pin ports 343 as the control pin 340 moves (downward) relative to the check disk 350. The check disk 350 includes an outer skirt 353, which maintains a precise relationship between the metering edge 357 and the control pin ports 343 by virtue of both the check disk 350 and the control pin 343 utilizing a common seating surface 321. This configuration eliminates any tolerance stack issues that would otherwise affect the precision between the metering edge 357 and the control pin ports 343.

According to an aspect of the disclosure, a self-adjusting valve catch prevents excessive closing velocity of the slave piston (downward direction in FIG. 11) and thus prevents excessive closing movement of the motion receiving components in the valve train and thus prevents excessive closing velocity of the engine valve(s) associated with the valve train. According to another aspect of the disclosure, the valve catch check disk and control pin share a common seating surface. This common seating configuration reduces the tolerance stack of the cooperating parts, making the valve lift seating profile and seating velocity control less sensitive to dimensional variations in the control pin and check disk (i.e., manufacturing tolerances).

Control pin ports 343 may be progressively occluded by the check disk 350 during a valve catch mode of operation, as will be described. During normal valve lift operation of the master-slave hydraulic circuit (i.e., as dictated by the profile of cam 10), hydraulic pressure increase in the master piston chamber 214, which results from upward movement of the master piston, causes the slave piston and control pin to move upward together and the engine valve to open. The slave piston and control pin move substantially together due to the low leakage flow between the slave piston and the auto-lash chambers. The check disk may initially move upward relative to the control pin to allow flow into the slave piston chamber. As the slave piston lift increases, the check disk moves downward relative to the control pin and contacts the control pin stop 345. The engine valve may close due to the cam profile or opening of the HSSV. As the engine valve initially closes, the slave piston and control pin move together, and the check disk remains in contact with the control pin check disk stop 345. At an engine valve lift of typically 3 mm, the check disk seating surface 351 contacts the valve catch seat annular seating surface 321, directing the flow out of the slave piston chamber through the control pin radial holes 343. Initially with the check disk in contact with the control pin check disk stop 345, the flow area of the holes does not significantly restrict the flow. As the engine valve approaches zero lift, the check disk moves relative to the control pin, and the check disk metering edge 357 progressively occludes the radial holes. At an engine valve lift of typically 0.3-0.5 mm, the radial holes are fully occluded directing the flow out of the slave piston through the diametrical clearance between the check disk 350 and the control pin 340. The occluding hole area vs. lift profile is analogous to the acceleration portion of a cam profile closing feature, and the check disk—control pin diametrical clearance flow area is analogous to a cam profile constant velocity ramp.

Over the valve lift event and during valve seating, the auto-lash chamber pressure is lower than the slave piston pressure due to spring forces and piston diameters. This causes oil to leak from the slave piston to auto-lash chamber via the diametrical clearance between the control piston bore and collar. At an engine valve lift typically below 0.1 mm, the control pin seating surface contacts the valve catch seat annular seating surface. This causes the slave piston chamber pressure to drop to nearly ambient pressure and the auto-lash chamber pressure to increase due to the engine valve spring load. Oil leaks from the auto-lash to the slave piston chamber until the engine valve seats and unloads the valve springs. This both provides both additional slowing of the engine valve and the auto-lash function that the control pin contacts the valve catch seat approximately when the engine valve contacts the engine valve seat. According to further aspects of the disclosure, guiding features of the check disk spring 356 and the control pin ensure that the control pin ports are not contacted by the spring 356, thus avoiding avoid wear of the port edges by the spring 356. The control pin-check disk diametrical clearance is sufficiently large to prevent the check disk-control pin from locking due to friction force and to provide acceptable sensitivity to oil viscosity.

Figure 12:
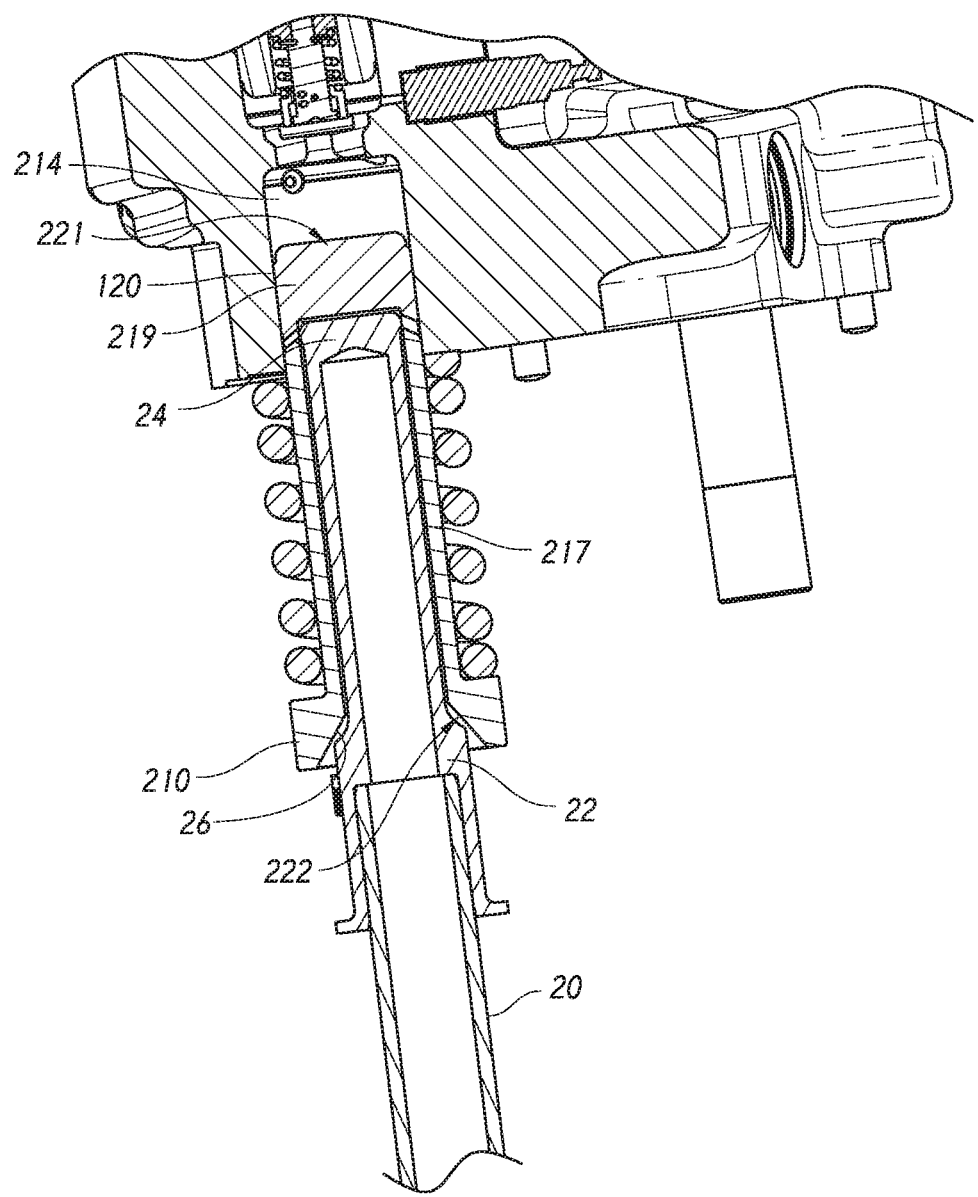
FIG. 12 is a cross-section of example master piston/push tube interface components suitable for use in the LMVVA assembly of FIGS. 1-6.
Figure 13:
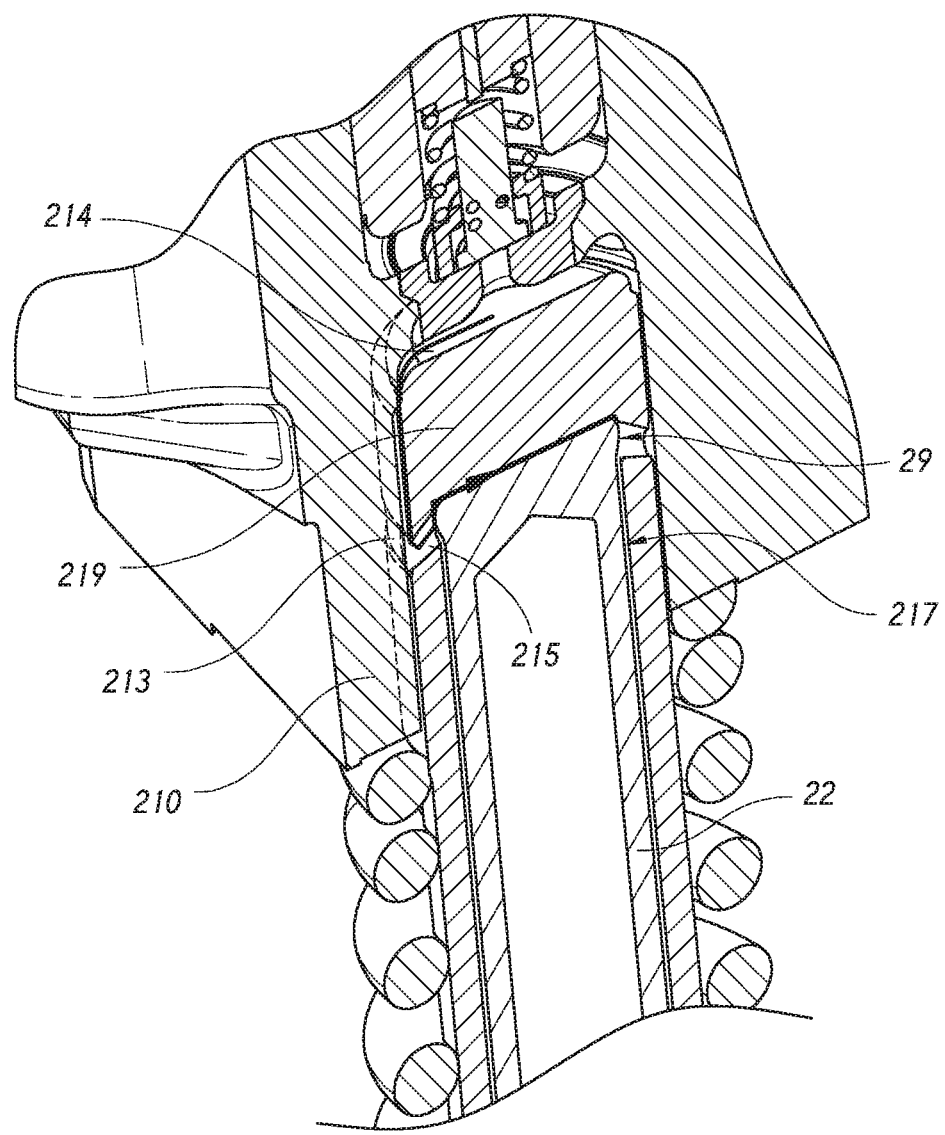
FIG. 13 is a detailed cross-section of the master piston/push tube interface components of FIG. 12.

FIGS. 12 and 13 are cross-sections, which illustrate details of an example push tube/master piston interface. In accordance with aspects of the disclosure, the master piston of the VVA assembly may be provided with advantageous features to ensure stability of operation and durability of the motion receiving interface for the VVA assembly. Push tube 20 may cooperate with a push tube cap 22 which engages an end of the push tube 20 and extends at a significant depth into the master piston push tube socket 217 such that the end 24 of the push tube cap 22 is in close proximity to the external surface 221 of master piston end wall 219. Preferably, the depth should be sufficient to locate interface between the push tube end 24 and the master piston end wall 219 within the master piston bore 120 of the housing 110. The socket depth may be such that the interface between the push tube and master piston (i.e., the thickness of the master piston end wall, may preferably be less than the diameter of the piston. This configuration provides minimal, if any, side loading on the push tube cap. That is, the forces applied by the push tube 20 and push tube cap 22 in combination with the high-pressure forces applied to the external surface 221 will not create any appreciable side loading on the push tube cap 22, especially in the vicinity of the end wall 219. This reduces lateral forces on the push tube, cap and master piston, provides for more stable operation and reduces frictional loss and wear.

To further enhance alignment of the push tube cap 22 within the master piston push tube socket 217, the push tube cap 22 may be provided with a slight radius on the end 24 in order to accommodate very slight angular variation in alignment and to keep contact stresses low. As a further measure, the master piston end wall 219 may be provided with a flat or a slightly concave surface, preferably having a radius that is greater than the radius provided on the push tube cap end 24, to further reduce contact stress and ensure alignment of the push tube cap 24 within the master piston push tube socket 217. To still further enhance alignment, the push tube cap 22 may be provided with a radially extending, annular protuberance or bump 29 that provides axial alignment of the push tube cap within the master piston socket. This configuration provides a centering force on the end of the push tube cap 22 that is opposite the end wall 24. The push tube end/push tube cap end may define a toroid annular shape with the push tube receiving socket of the master piston.

In accordance with aspects of the disclosure, an example VVA assembly may provide enhanced lubrication capabilities at the master piston/push tube interface. Referring to FIG. 13, and again to FIGS. 5, 6 and 8-10, the annular groove 213 and radial extending ports 215 on the master piston may supply engine oil to the master piston push tube socket 217 and thus to the push tube/master piston interface. According to an aspect of the disclosure, the respective dimensions of the master piston and the master piston bore are configured to provide an annular clearance, which, under the high-pressure forces in the master piston chamber, provide for the bleed or leakage of oil into the annular space, where it is collected by the master piston annular groove and directed within the master piston push tube receiving socket. The oil may originate in the master piston chamber and may leak between the lateral outer surface of the master piston 210 and the master piston chamber 120. The groove 213 may thus function to collect or "scavenge" oil that has leaked from the master piston chamber into this space and convey it to the push tube/master piston interface. The above-described radial centering features may keep the push tube convex piston face centered inside of the master piston and also maintain a perimeter to contain the hydraulic fluid film from leaking out of the high-pressure circuit.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An engine valve actuation assembly for providing variable valve actuation in an engine valve train comprising:
   a housing;
   a master piston bore defined in the housing;
   a master piston cooperating with the master piston bore to define a master piston chamber; the master piston having a motion receiving interface for receiving motion from a motion source in the engine valve train;
   a slave piston bore defined in the housing;
   a slave piston cooperating with the slave piston bore to define a slave piston chamber, the slave piston having a motion transferring interface for transferring motion to a motion receiving component in the engine valve train;
   wherein the master piston motion receiving interface comprises a push tube receiving socket in the master piston for receiving a push tube end, and wherein the master piston includes at least one lubrication passage arranged to convey lubricant from the master piston bore to the push tube receiving socket.

2. The engine valve actuation assembly of claim 1, wherein the push tube receiving socket further comprises a push tube receiving socket end wall having a flat or concave surface.

3. The engine valve actuation assembly of claim 2, further comprising a push tube cap cooperating with the push tube receiving socket, the push tube cap having a push tube cap end wall having a convex surface.

4. The engine valve actuation assembly of claim 3, wherein the push tube receiving socket end wall has a push tube receiving socket end wall concave surface, which has a radius of curvature that is greater than a radius of curvature of the push tube cap end wall.

5. The engine valve actuation assembly of claim 1, wherein the master piston has a length measured from a push tube receiving end to a distal end and wherein the push tube receiving socket extends to a depth within the master piston that is at least half master piston length.

6. The engine valve actuation assembly of claim 1, further comprising a push tube, wherein the push tube includes an end, and wherein the end includes an annular toroid shape adapted to contact a side wall of the push tube receiving socket of the master piston.

7. The engine valve actuation assembly of claim 1, wherein the master piston includes an annular master piston spring seat disposed on a push tube receiving end thereof.

8. The engine valve actuation assembly of claim 1, wherein the master piston and slave piston are substantially axially aligned.

9. The engine valve actuation assembly of claim 1, further comprising a dry start hydraulic circuit in fluid communication with the master piston chamber for supplying working fluid to the master piston chamber during an engine start cycle.

10. The engine valve actuation assembly of claim 1, further comprising a master piston retainer for retaining the master piston in an installed position on the housing prior to assembly on an engine, wherein the master piston retainer comprises a fastener disposed on the housing and arranged to engage a portion of the master piston that is disposed outside the master piston bore.

11. The engine valve actuation assembly of claim 1, wherein the lubrication passage extends from an external surface of the master piston to the push tube receiving socket.

12. The engine valve actuation assembly of claim 11, wherein the master piston includes an annular groove and wherein the lubrication passage extends from the annular groove to the push tube receiving socket.

13. The engine valve actuation assembly of claim 1, wherein the master piston includes an annular spring seat and a master piston spring disposed between an external surface on the housing and the annular spring seat, the engine valve actuation assembly further comprising a master piston retainer disposed outside of the housing and retaining the master piston in an installed position such that the master piston may be installed on a push tube while the master piston retainer remains in place.

14. The engine valve actuation assembly of claim 1, further comprising:
an accumulator;
an engine oil connection for supplying oil to the accumulator;
a master piston spring arranged to bias the master piston toward the motion source;
a selectively actuated hydraulic valve disposed between the master piston and the accumulator;
a dry start reservoir in fluid communication with the accumulator and located vertically higher than the master piston for supplying working fluid to the master piston chamber during an engine start before engine oil supply pressure has reached normal levels.

15. The engine valve actuation assembly of claim 14, further comprising an accumulator bore defined in the housing, an accumulator piston cooperating with the accumulator bore to define an accumulator chamber; and an accumulator spring biasing the accumulator piston toward an end of the accumulator bore; and an accumulator bleed orifice, wherein the accumulator piston cooperates with the bleed orifice, the accumulator piston being arranged to selectively occlude the bleed orifice.

16. The engine valve actuation assembly of claim 14, wherein the dry start reservoir comprises at least one vent to ambient pressure.

17. The engine valve actuation assembly of claim 1, further comprising a valve catch component cooperating with the slave piston to control valve seating velocity.

18. The engine valve actuation assembly of claim 17, wherein the valve catch component includes a check disk cooperating with a control pin of the slave piston to selectively occlude at least one oil passage in the control pin as the control pin moves.

19. The engine valve actuation assembly of claim 18, the valve catch having a common seat for the check disk and control pin.

20. The engine valve actuation assembly of claim 18, further comprising a collar for guiding the control pin within a bore in the slave piston, wherein the collar is press fit on the control pin.

21. An engine valve actuation assembly for providing variable valve actuation in an engine valve train comprising:
a housing;
a master piston bore defined in the housing;
a master piston cooperating with the master piston bore to define a master piston chamber; the master piston having a motion receiving interface for receiving motion from a motion source in the engine valve train;
a slave piston bore defined in the housing;
a slave piston cooperating with the slave piston bore to define a slave piston chamber; the slave piston having a motion transferring interface for transferring motion to a motion receiving component in the engine valve train;
a dry start system cooperating with the master piston chamber for supplying working fluid to the master piston chamber during an engine start, wherein the dry start system comprises an accumulator bore defined in the housing, an accumulator piston cooperating with the accumulator bore to define an accumulator chamber, and an accumulator spring biasing the accumulator piston toward an end of the accumulator bore; and wherein the dry start system further comprises a dry start reservoir in fluid communication with the accumulator chamber; and
at least one valve disposed between the master piston and the accumulator bore; and
a master piston spring arranged to bias the master piston toward the motion source in the engine valve train, wherein the dry start reservoir is configured to retain oil when an engine is shut down, and the master piston pulls oil from the dry start reservoir on a closing portion of the cam profile during an engine dry start.

22. The engine valve actuation assembly of claim 21, wherein the dry start reservoir is located vertically above the master piston.

23. The engine valve actuation assembly of claim 22, wherein the dry start reservoir comprises at least one vent to ambient pressure.

24. The engine valve actuation assembly of claim 21, further comprising at least one high-pressure check valve arranged in parallel with the at least one valve.

25. The engine valve actuation assembly of claim 21, wherein the accumulator piston cooperates with a bleed orifice, the accumulator piston being arranged to selectively occlude the bleed orifice.

26. The engine valve actuation assembly of claim 21, wherein the housing is formed as a pedestal adapted to be mounted to an engine overhead assembly, wherein the housing is a rocker shaft pedestal configured to support a rocker shaft.

27. The engine valve actuation assembly of claim 26, wherein the housing is configured to be a valve rocker pedestal and wherein the master piston, slave piston, accumulator, and dry start reservoir are integrated into the valve rocker pedestal to provide a modular add-on assembly adapted to be attached to an engine head.

28. The engine valve actuation assembly of claim 21, further comprising a valve catch component cooperating with the slave piston to control valve seating velocity.

29. The engine valve actuation assembly of claim 28, wherein the valve catch component includes a check disk cooperating with a control pin of the slave piston to selectively occlude at least one oil passage in the control pin as the control pin moves.

30. The engine valve actuation assembly of claim 29, the valve catch component having a common seat for the check disk and control pin.

31. The engine valve actuation assembly of claim 29, further comprising a collar for guiding the control pin within a bore in the slave piston, wherein the collar is press fit on the control pin.

32. The engine valve actuation assembly of claim 21, wherein the dry start reservoir comprises a reservoir bore, formed in the housing, and a reservoir cap for enclosing the reservoir bore and having at least one vent.

\* \* \* \* \*